(12) United States Patent
Wang et al.

(10) Patent No.: US 12,504,123 B2
(45) Date of Patent: Dec. 23, 2025

(54) GAS STORAGE RESERVOIR, ENERGY STORAGE DEVICE, AND CONTROL METHOD AND MOUNTING METHOD FOR GAS STORAGE RESERVOIR

(71) Applicant: EXA ENERGY TECHNOLOGY (SHENZHEN) CO. LTD., Guangdong (CN)

(72) Inventors: Qin Wang, Shenzhen (CN); Yonghui Xie, Shenzhen (CN); Yongliang Guo, Shenzhen (CN); Xiaoyong Wang, Guangdong (CN); Feng Yang, Guangdong (CN); Hui Zhang, Guangdong (CN); Zhixin Tang, Guangdong (CN)

(73) Assignee: EXA ENERGY TECHNOLOGY (SHENZHEN) CO. LTD., Guangdong (CN)

( * ) Notice: Subject to any disclaimer, the term of this patent is extended or adjusted under 35 U.S.C. 154(b) by 154 days.

(21) Appl. No.: 18/044,900

(22) PCT Filed: Dec. 8, 2021

(86) PCT No.: PCT/CN2021/136477
§ 371 (c)(1),
(2) Date: Mar. 10, 2023

(87) PCT Pub. No.: WO2022/237144
PCT Pub. Date: Nov. 17, 2022

(65) Prior Publication Data
US 2023/0358362 A1    Nov. 9, 2023

(30) Foreign Application Priority Data

May 11, 2021 (CN) .......................... 202110510553.1

(51) Int. Cl.
*F17C 13/08* (2006.01)
*F17C 1/12* (2006.01)
*F17C 13/02* (2006.01)

(52) U.S. Cl.
CPC .............. *F17C 1/12* (2013.01); *F17C 13/025* (2013.01); *F17C 13/026* (2013.01);
(Continued)

(58) Field of Classification Search
CPC .. F17C 13/08; F17C 13/12; F17C 2201/0185; F17C 2203/0631; F17C 2203/0685;
(Continued)

(56) References Cited

U.S. PATENT DOCUMENTS

2008/0051620 A1\* 2/2008 Deyerling .............. C12M 23/46
588/251
2009/0173229 A1 7/2009 Nagase et al.
(Continued)

FOREIGN PATENT DOCUMENTS

AT 391181 B \* 8/1990
CN 203222807 U 10/2013
(Continued)

OTHER PUBLICATIONS

International Search Report and Written Opinion from International Application No. PCT/CN2021/136477 mailed Mar. 16, 2022.
(Continued)

*Primary Examiner* — Mollie Impink
(74) *Attorney, Agent, or Firm* — Ballard Spahr LLP (57) ABSTRACT

A gas storage reservoir, an energy storage device, and a control method and a mounting method for the gas storage reservoir. An inner foundation structure surrounds the outer side of a ground film; an outer foundation structure surrounds the outer side of the inner foundation structure; the edge of an inner film is fixed to the inner foundation
(Continued)

structure; an inner cable net is arranged on the outer surface of the inner film; an accommodating cavity is defined between the inner film and the ground film, and the inner film comprises a metal layer; an outer film structure covers the outside of the inner film structure; the outer film structure comprises an outer film and an outer cable net an interlayer cavity is defined between the outer film and the inner film; an air supply device is configured to inflate the interlayer cavity.

17 Claims, 6 Drawing Sheets

(52) U.S. Cl.
 CPC .... *F17C 13/081* (2013.01); *F17C 2203/0636* (2013.01); *F17C 2205/0332* (2013.01)
(58) Field of Classification Search
 CPC ...... F17C 2205/0184; F17C 2223/0123; F17C 2221/033; C12M 23/26
 See application file for complete search history.

(56) References Cited

U.S. PATENT DOCUMENTS

| | | | | |
|---|---|---|---|---|
| 2010/0316310 | A1* | 12/2010 | Heater | B60K 15/03177 383/119 |
| 2013/0306538 | A1 | 11/2013 | Morris | |
| 2014/0154794 | A1* | 6/2014 | Fotyga | C12M 41/12 435/290.4 |
| 2019/0072236 | A1 | 3/2019 | Ptaszek | |
| 2019/0218123 | A1* | 7/2019 | Spedini | C02F 3/00 |
| 2024/0003272 | A1* | 1/2024 | Xie | F01K 3/14 |

FOREIGN PATENT DOCUMENTS

| | | | | | |
|---|---|---|---|---|---|
| CN | 204311565 | U | | 5/2015 | |
| CN | 204482525 | U | | 7/2015 | |
| CN | 204626667 | U | | 9/2015 | |
| CN | 106436906 | A | | 2/2017 | |
| CN | 206298960 | U | | 7/2017 | |
| CN | 106149884 | B | * | 7/2018 | |
| CN | 109335366 | A | | 2/2019 | |
| CN | 209672041 | U | | 11/2019 | |
| CN | 111894134 | A | | 11/2020 | |
| CN | 113280252 | A | | 8/2021 | |
| DE | 102013213431 | B3 | * | 8/2014 | ............. G01F 22/02 |
| EP | 1338843 | A2 | | 8/2003 | |
| EP | 2492576 | A1 | * | 8/2012 | ................ F17C 1/16 |
| EP | 2792930 | A2 | * | 10/2014 | ............. F17C 13/02 |
| EP | 3276245 | A1 | * | 1/2018 | ............. F17C 3/022 |
| JP | S56134786 | A | | 10/1981 | |
| WO | 2020039416 | A2 | | 2/2020 | |

OTHER PUBLICATIONS

First Office Action for Chinese Patent Application No. 20210510553.1 mailed Feb. 17, 2022.
Second Office Action for Chinese Patent Application No. 202110510553.1 mailed Mar. 31, 2022.
Yin , "Steel Structure Fabrication and Installation Process Manual", China Planning Press, May 31, 2006, pp. 506-507.
EP21941706.0 Extended European Search Report dated Sep. 17, 2024. 5 pages.
Third Party Observations for European Application No. 21941706.0 mailed Feb. 12, 2025,.

* cited by examiner

GAS STORAGE RESERVOIR, ENERGY STORAGE DEVICE, AND CONTROL METHOD AND MOUNTING METHOD FOR GAS STORAGE RESERVOIR

CROSS-REFERENCE TO RELATED APPLICATIONS

This application is an U.S. national phase application under 35 U.S.C. § 371 based upon international patent application No. PCT/CN2021/136477, filed on Dec. 8, 2021, which itself claims priority to Chinese patent application No. 2021105105531 filed on May 11, 2021. The contents of the above-identified applications are hereby incorporated herein in their entireties by reference.

TECHNICAL FIELD

The present disclosure relates to the field of energy storage, in particular to a gas storage reservoir, energy storage device, a control method and a mounting method for gas storage reservoir.

BACKGROUND

In the related art, there is a way to store energy by compressing gas such as carbon dioxide or air. The main principle is to store excess electricity output by a power plant through the gas as a storage medium during a low period of electricity consumption, and then release it to do external work during a peak period of electricity consumption. Among energy storage devices, a gas storage reservoir an indispensable portion, through which the gas is stored and released to meet needs of an energy storage system. Generally, the greater a span of an air-membrane building of the same length, the greater a volume created, the more gas can be hold, the greater a tension on a membrane material in a direction of the span, and the easier it is to rupture. In order to prevent the membrane material from being torn, the volume of the gas storage reservoir cannot be configured larger, and a gas storage capacity is therefore limited. In addition, the gas stored in some existing gas storage reservoirs is prone to leakage.

SUMMARY

Accordingly, the present disclosure provides a gas storage reservoir. A volume of the gas storage reservoir can be designed larger to store more gas, and a membrane material is not easy to be torn, and a leakage amount is less when the gas is stored for a long time.

A gas storage reservoir, including: a ground membrane; an inner foundation structure surrounding an outer side of the ground membrane; an outer foundation structure surrounding an outer side of the inner foundation structure; an inner membrane structure including an inner membrane and an inner cable net, wherein an edge of the inner membrane is fixed to the inner foundation structure, the ground membrane is connected to the inner membrane, the inner cable net is provided on an outer surface of the inner membrane, the inner cable net is fixed to the inner foundation structure, an accommodation cavity is defined between the inner membrane and the ground membrane, the inner membrane includes a metal layer; an outer membrane structure covering an outside of the inner membrane structure, wherein the outer membrane structure includes an outer membrane and an outer cable net, an edge of the outer membrane is fixed to the outer foundation structure, the outer cable net is provided on an outer surface of the outer membrane, the outer cable net is fixed to the outer foundation structure, a sandwich cavity is defined between the outer membrane and the inner membrane; an air supply device configured to inflate the sandwich cavity; and an exhaust device configured to discharge a gas in the sandwich cavity.

In one of the embodiments, the ground membrane includes a metal layer.

In one of the embodiments, the inner foundation structure includes an inner support element and an inner fixing element, the edge of the inner membrane is sandwiched between the inner support element and the inner fixing element, the inner support element is fixed to the inner fixing element.

In one of the embodiments, a suspension element is provided on the inner foundation structure, the inner cable net is hung on the suspension element.

In one of the embodiments, the outer foundation structure includes an outer support element and an outer fixing element, the edge of the outer membrane is sandwiched between the outer support element and the outer fixing element, and the outer support element is fixed to the outer fixing element.

In one of the embodiments, a suspension element is provided on the outer foundation structure, the outer cable net is hung on the suspension element.

In one of the embodiments, the inner foundation structure and the outer foundation structure are connected as a whole.

In one of the embodiments, the inner membrane structure further includes an inner membrane insulation layer.

In one of the embodiments, the inner membrane insulation layer includes a lining membrane suspended on the inner membrane, an insulation cavity is formed between the lining membrane and the inner membrane, the insulation cavity is in communication with the accommodating cavity.

In one of the embodiments, the outer membrane structure further includes an outer membrane insulation layer.

In one of the embodiments, an insulation layer is provided under the ground membrane.

In one of the embodiments, the gas storage reservoir further includes a pressure relief device provided between the accommodating cavity and the sandwich cavity, wherein the pressure relief device is configured to communicate with the accommodating cavity and the sandwich cavity.

In one of the embodiments, the gas storage reservoir further includes a volume measuring device configured to measure a volume of the accommodating cavity.

In one of the embodiments, the gas storage reservoir further includes a door system, wherein the door system includes an outer door system that communicates an outside world with the sandwich cavity, and/or an inner door system that communicates the sandwich cavity with the accommodating cavity.

In the above-mentioned gas storage reservoir, the inner membrane structure is provided with the inner cable net fixed to the inner foundation structure, the inner cable net is located on the outer surface of the inner membrane, the outer membrane structure is provided with the outer cable net fixed to the outer foundation structure, the outer cable net is located on the outer surface of the outer membrane. When the accommodating cavity in the inner membrane is filled with gas, after the inner membrane is inflated to a certain extent, it will resist the inner cable net, and share the force on the inner membrane through the inner cable net, so that the inner membrane is not easy to be torn. Similarly, the outer cable net can also share the force on the outer membrane, so that the outer membrane is not easy to be torn. If the volume of the gas storage reservoir is designed to be larger, since the cable net is provided to share the force of the membrane material, the membrane material cannot be easily torn. Therefore, the gas storage reservoir can increase the volume while ensuring that the membrane material is not torn. In addition, since the inner membrane includes the metal layer, compared with conventional polymer membrane materials, the metal layer makes the gas permeability lower, which can reduce the leakage of gas.

The present disclosure further provides an energy storage device, including the above-mentioned gas storage reservoir.

In the above-mentioned energy storage device, by using the above gas storage reservoir with a larger volume to store more gas, the gas supply will be more sufficient during energy storage, so that more energy storage can be achieved, and the leakage of gas can be reduced.

The present disclosure further provides a control method of the above-mentioned gas storage reservoir, including: keeping an air pressure difference between the sandwich cavity and the outside constant.

In one of the embodiments, the air pressure difference between the sandwich cavity and the outside world is monitored in real time and fed back to a controller, when the accommodating cavity is filled with the gas, the controller controls the exhaust device to increase an amount of the gas discharged from the sandwich cavity, and/or the controller controls the air supply device to reduce an amount of the gas sent to the sandwich cavity; when the gas is discharged from the accommodating cavity, the controller controls the exhaust device to reduce the amount of the gas discharged from the sandwich cavity, and/or the controller controls the air supply device to increase the amount of the gas sent to the sandwich cavity.

The above-mentioned control method of the gas storage reservoir has a larger volume of the gas storage reservoir, which can store more gas, and the pressure difference between the sandwich cavity and the outside remains unchanged, which can make the storage of gas into and out of the storage cavity more stable, and increase the resistance of the outer membrane structure against wind and snow.

The present disclosure further provides a mounting method of the above-mentioned gas storage reservoir, after the inner foundation structure, the outer foundation structure, the air supply device, the exhaust device, and the door system are mounted, the outer membrane structure is first mounted and inflated, then the ground membrane and the inner membrane structure are mounted.

In the above mounting method, after the outer membrane structure is mounted and inflated to form a support, when mounting the ground membrane and the inner membrane structure, due to a protection of the outer membrane structure, an external environment is not easy to affect the mounting of the inner membrane structure and the ground membrane. Rain, snow, dust and sundries will not enter the accommodating cavity formed by the inner membrane structure and the ground membrane.

DETAILED DESCRIPTION OF THE EMBODIMENTS

In order to make the above objects, features and advantages of the present disclosure more obvious and easier to understand, the specific embodiments of the present disclosure are described in detail below in combination with the accompanying drawings. Many specific details are set forth in the following description to facilitate a full understanding of the invention. However, the present disclosure can be implemented in many ways different from those described herein, and those skilled in the art can make similar improvements without violating the connotation of the invention. Therefore, the invention is not limited by the specific embodiments disclosed below.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which is only for the convenience of describing the present disclosure and simplifying the description, rather than indicating or implying that the device or element must have a specific azimuth, be constructed and operated in a specific azimuth, so it cannot be understood as a limitation of the present disclosure.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

In the present disclosure, unless otherwise expressly specified and limited, the terms "mounting", "connect", "contact", "fix" and other terms should be understood in a broad sense, for example, they can be fixed connections, removable connections, or integrated. It can be mechanical connection or electrical connection. It can be directly connected or indirectly connected through an intermediate medium. It can be the connection within two elements or the interaction relationship between two elements, unless otherwise expressly limited. For those skilled in the art, the specific meaning of the above terms in the present disclosure can be understood according to the specific situation.

In the present disclosure, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

It should be noted that when an element is called "fixed to" or "disposed on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Figure 1:
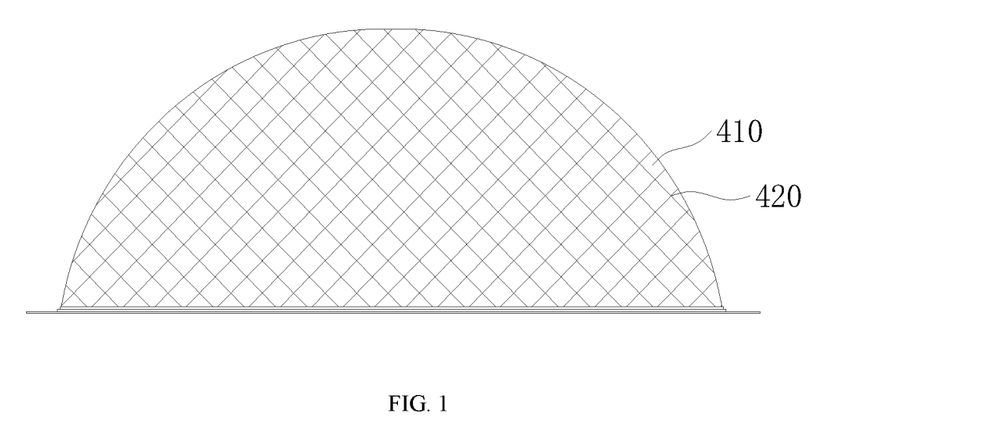
FIG. 1 is a schematic view of an overall structure of a gas storage reservoir in an embodiment of the present disclosure.
Figure 2:
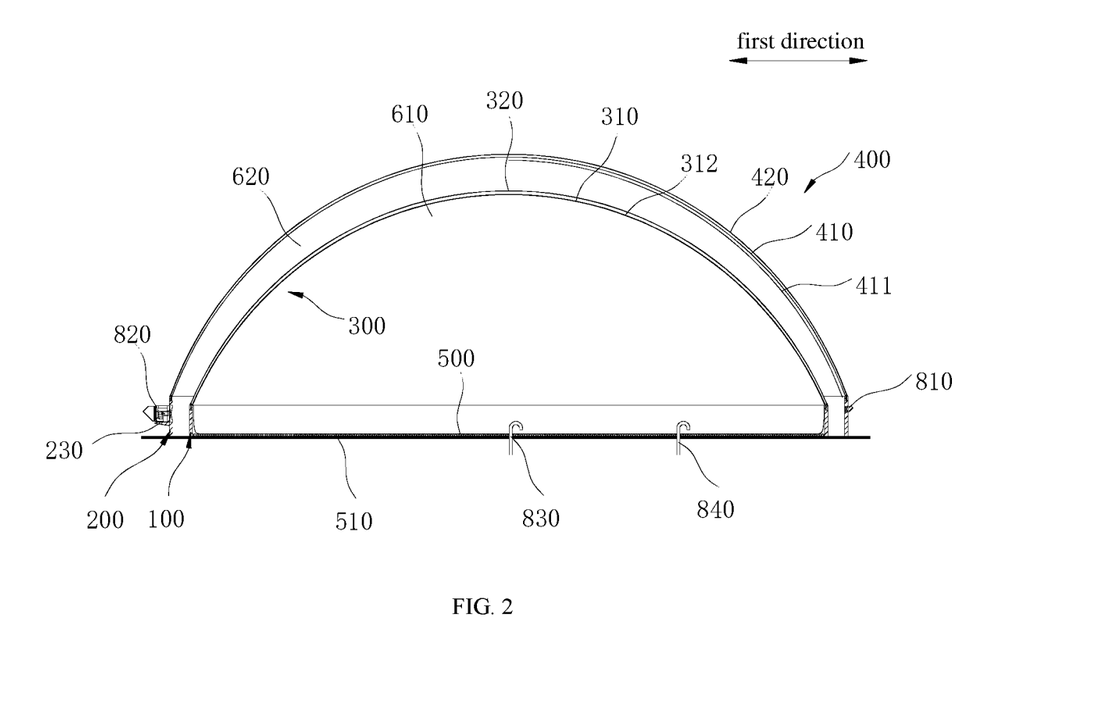
FIG. 2 is a schematic view of an internal structure of the gas storage reservoir in FIG. 1.

Referring to FIG. 1 and FIG. 2, a gas storage reservoir provided by an embodiment of the present disclosure includes an inner foundation structure 100, an outer foundation structure 200, an inner membrane structure 300, an outer membrane structure 400, a ground membrane 500, an exhaust device 810 and an air supply device 820. The ground membrane 500 is laid on the ground, the inner foundation structure 100 is provided surrounding a perimeter of the ground membrane 500, and the outer foundation structure 200 is provided surrounding a perimeter of the inner foundation structure 100. That is, both the inner foundation structure 100 and the outer foundation structure 200 are ring-shaped. The inner membrane structure 300 includes an inner membrane 310 and an inner cable net 320, the ground membrane 500 is connected to the inner membrane 310, and an edge the inner membrane 310 is fixed to the inner foundation structure 100. A part of the ground membrane 500 located inside the inner foundation structure 100 sags under an action of gravity and is attached to the ground. A closed accommodating cavity 610 can be formed between the inner membrane 310 and the ground membrane 500, and the accommodating cavity 610 can accommodate a gas to be stored. The inner membrane 310 includes a metal layer. The inner cable net 320 is laid on an outer surface of the inner membrane 310, an edge of the inner cable net 320 is fixed to the inner foundation structure 100. The outer membrane structure 400 covers an outside of the inner membrane structure 300 with a certain distance between them. The outer membrane structure 400 includes an outer membrane 410 and an outer cable net 420, an edge of the outer membrane 410 is fixed to the outer foundation structure 200. The outer cable net 420 is laid on an outer surface of the outer membrane 410, the edge of the outer cable net 420 is fixed to the outer foundation structure 200. A closed sandwich cavity 620 is formed between the inner membrane structure 300, the outer membrane structure 400, the inner foundation structure 100, the outer foundation structure 200, and the ground. The air supply device 820 is configured to inflate the sandwich cavity 620, the exhaust device 810 is configured to discharge the gas in the sandwich cavity 620 to the outside.

The outer membrane 410 of the above-mentioned gas storage reservoir is configured to resist wind and snow, the outer membrane 410 is supported upward by the gas in the sandwich cavity 620 to maintain its shape, so that the gas storage reservoir is not easy to collapse. The inner membrane 310 of the gas storage reservoir is configured to store gas. When the gas storage reservoir is in use, the gas can be stored in the accommodating cavity 610 or the gas can be output from the accommodating cavity 610. When gas is stored in the accommodating cavity 610, the inner membrane 310 will be gradually inflated, a volume of the accommodating cavity 610 will gradually increase, and a volume of the sandwich cavity 620 will gradually decrease. When the gas is discharged from the accommodating cavity 610, the inner membrane 310 will gradually collapse downwards, the volume of the accommodating cavity 610 will gradually decrease, the volume of the sandwich cavity 620 will gradually increase. When the gas is not stored in the accommodating cavity 610, the inner cable net 320 is not fully tightened. During the storing of the gas into the accommodation cavity 610, after the inner membrane 310 is inflated to a certain extent, the inner cable net 320 will be gradually tightened, a pressure exerted by the gas in the accommodation cavity 610 on the inner membrane 310 is mainly withstood by the inner cable net 320. Generally, the greater a building span with the same length of air membranes, the greater a volume, the greater a tension on the membrane in the direction of the span (i.e., a first direction in the drawing), the more likely the membrane will break (this part is common knowledge in this field and will not be described further.). In this embodiment, by providing the inner cable net 320 to share the force on a membrane material, the inner membrane 310 cannot be easily torn, and then its span can be designed to be larger, and the volume of the accommodating cavity 610 formed is increased, so that a gas storage capacity is also increased. At the same time, since the outer surface of the outer membrane 410 has an outer cable net 420 to share a pressure applied to the outer membrane 410 by the gas in the sandwich cavity 620, the pressure in the sandwich cavity 620 can be higher, an overall hardness of the outer surface of the formed gas storage reservoir is higher, an ability to resist strong wind and snow is stronger. In addition, the inner membrane 310 includes a metal layer, which has a lower gas permeability, and the gas is not easy to leak. The metal layer can be disposed on an inside or outside of the inner membrane 310. Specifically, a conventional membrane material is a polymer material, with relatively sparse molecular arrangement and large gaps, while the molecules of the metal layer are closely arranged and the gaps are small, so the gas permeability is smaller.

Preferably, the ground membrane 500 also includes a metal layer. The metal layer can be provided on an inner side or an outer side of the ground membrane 500.

Specifically, in some embodiments, when the above-mentioned inner membrane 310 and the ground membrane 500 are manufactured, a main part thereof be covered by a layer of metal membrane. After the manufacturing is completed, the metal membrane and the main part of the membrane material form an integral body. The aforementioned inner membrane 310 and ground membrane 500 already include the aforementioned metal membrane.

Figure 3:
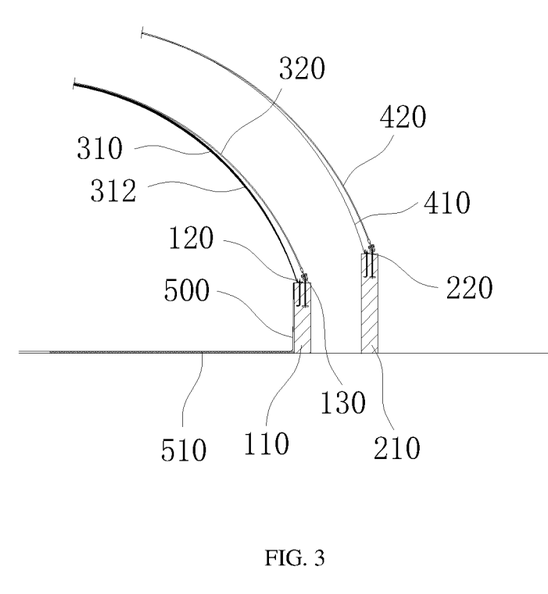
FIG. 3 is a partial enlarged view of an inner foundation structure and an outer foundation structure of the gas storage in FIG. 2.
Figure 4:
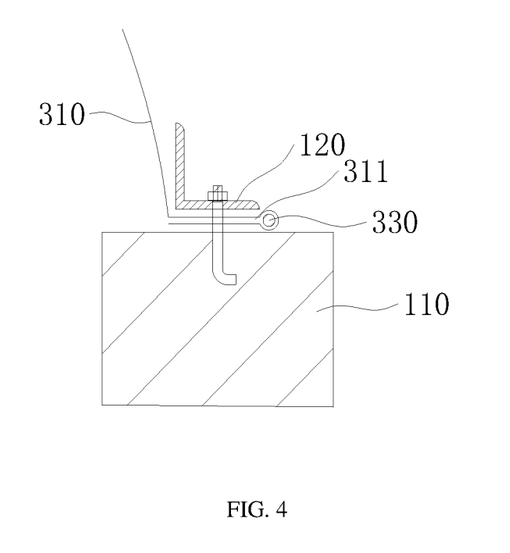
FIG. 4 is a schematic view of a partial structure of an inner foundation structure of the gas storage reservoir in FIG. 1.

Referring to FIGS. 2 to 4, in some embodiments, the inner foundation structure 100 includes an inner support element 110 and an inner fixing element 120, a bottom of the inner support element 110 extends into the ground for fixing. The inner fixing element 120 is located on a top of the inner support element 110. An edge of the inner membrane 310 is sandwiched between the inner support element 110 and the inner fixing element 120, the inner support element 110 is fixed to the inner fixing element 120, so as to achieve the fixation of the inner membrane 310. For example, the inner support element 110 and the inner fixing element 120 may be connected by threaded fasteners, the inner fixing element 120 may be an angle steel.

Preferably, in some embodiments, an inner membrane protector is provided between the inner membrane 310 and the inner support element 110. The inner membrane protector can be made of rubber or silica gel. By providing the inner membrane protector, uneven areas on the surface of the inner support element 110 can be prevented from scratching the inner membrane 310.

In some embodiments, the edge of the ground membrane 500 is pulled upwards to overlap with the edge of the inner membrane 310, and the edge of the inner membrane 310 and the edge of the ground membrane 500 are sandwiched between the inner support element 110 and the inner fixing element 120. Alternatively, the edge of the ground membrane 500 is pulled upwards and fixed to the inner membrane 310 by welding or heat sealing.

Similarly, the outer foundation structure 200 includes an outer support element 210 and an outer fixing element 220, a bottom of the outer support element 210 extends into the ground for fixing. The outer fixing element 220 is located on a top of the outer supporting 210. An edge of the outer membrane 410 is sandwiched between the outer support element 210 and the outer fixing element 220, the outer support element 210 is fixed to the outer fixing element 220, so as to achieve the fixation of the outer membrane 410. For example, the outer support element 210 and the outer fixing element 220 may be connected by threaded fasteners, the outer fixing element 220 may be an angle steel.

Since a size of the gas storage reservoir is generally large, preferably, the above-mentioned inner support element 110 and outer support element 210 can be formed by splicing multiple components. For example, when the edge of the ground membrane 500 is round, a plurality of arc-shaped elements can be spliced together to form the ring-shaped inner support element 110 and the outer support element 210. The inner support element 110 and the outer support element 210 are made of high-strength materials to ensure that they are not easily displaced or deformed by strong wind and snow. Similarly, the inner fixing element 120 and the outer fixing element 220 can also be formed by splicing multiple elements.

Preferably, an outer membrane protector is also provided between the outer membrane 410 and the outer support element 210, the outer membrane protector can be made of materials such as rubber or silica gel. By providing the outer membrane protector, uneven areas on the surface of the outer support element 210 can be prevented from scratching the outer membrane 410.

Preferably, the inner foundation structure 100 and the outer foundation structure 200 can be connected as a whole. For example, a base is provided at the bottoms of both, and both are connected to the base. In this way, it can be mounted more easily.

Referring to FIGS. 2 to 4, in some embodiments, the edge of the inner membrane 310 is bent to form a bending portion 311. An overlapping area of two layers at the bend is fixedly connected by means of heat sealing or welding. A limiting element 330 is clamped inside the bending portion 311, the limiting element 330 is located outside a connection between the inner support element 110 and the inner fixing element 120. In this way, after being fixed between the inner support element 110 and the inner fixing element 120, the inner membrane 310 is not easy to slip out from the two. Similarly, the edge of the outer membrane 410 is also bent, and a limiting element is provided. In a specific embodiment, the above-mentioned limiting element 330 can be a rope, the rope passes through the edge of the inner membrane 310 for a circle. After the rope is tightened, it can be stuck in a gap between the inner support element 110 and the inner fixing element 120, so as to limit the position.

In some embodiments, the inner foundation structure 100 is further provided with a suspension element 130, the suspension element 130 is fixed to the inner foundation structure 100. For example, the two are connected by threaded fasteners, or the two can also be provided as an integral structure. Alternatively, the suspension element 130 can also be located on the inner fixing element 120, the suspension element 130 is fixed to the inner fixing element 120. An edge of the inner cable net 320 is hung on the suspension element 130. The above-mentioned suspension element 130 can be selected from components such as a hook or a pulley. Alternatively, a D-shaped ring is provided at the edge of the inner cable net 320, the suspension element 130 is an inverted U-shaped structure embedded in the inner support element 110, the D-shaped ring is hooked on the inverted U-shaped structure. Similarly, the outer foundation structure 200 is also provided with a suspension element, and the suspension elements are fixed to the outer foundation structure 200, which will not be repeated here. An edge of the outer cable net 420 is hung on the suspension element.

Figure 5:
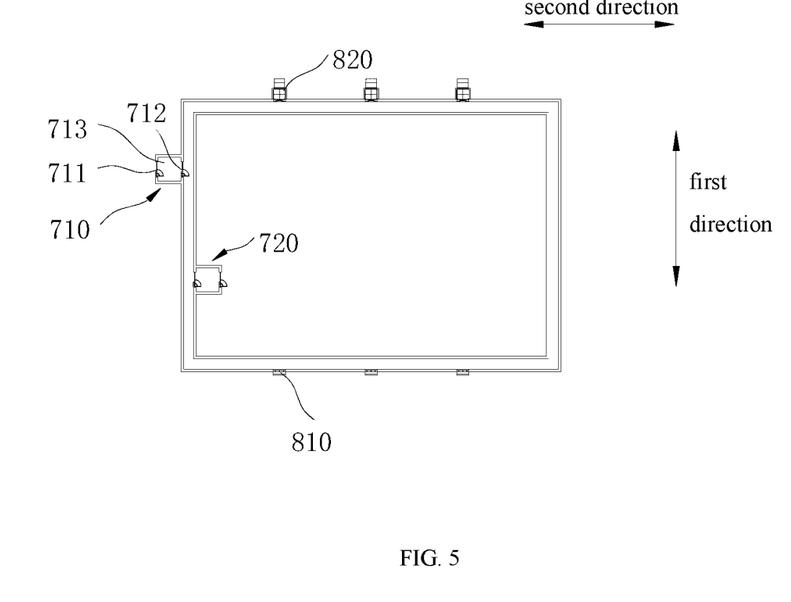
FIG. 5 is a top view of the gas storage reservoir in FIG. 1.
Figure 9:
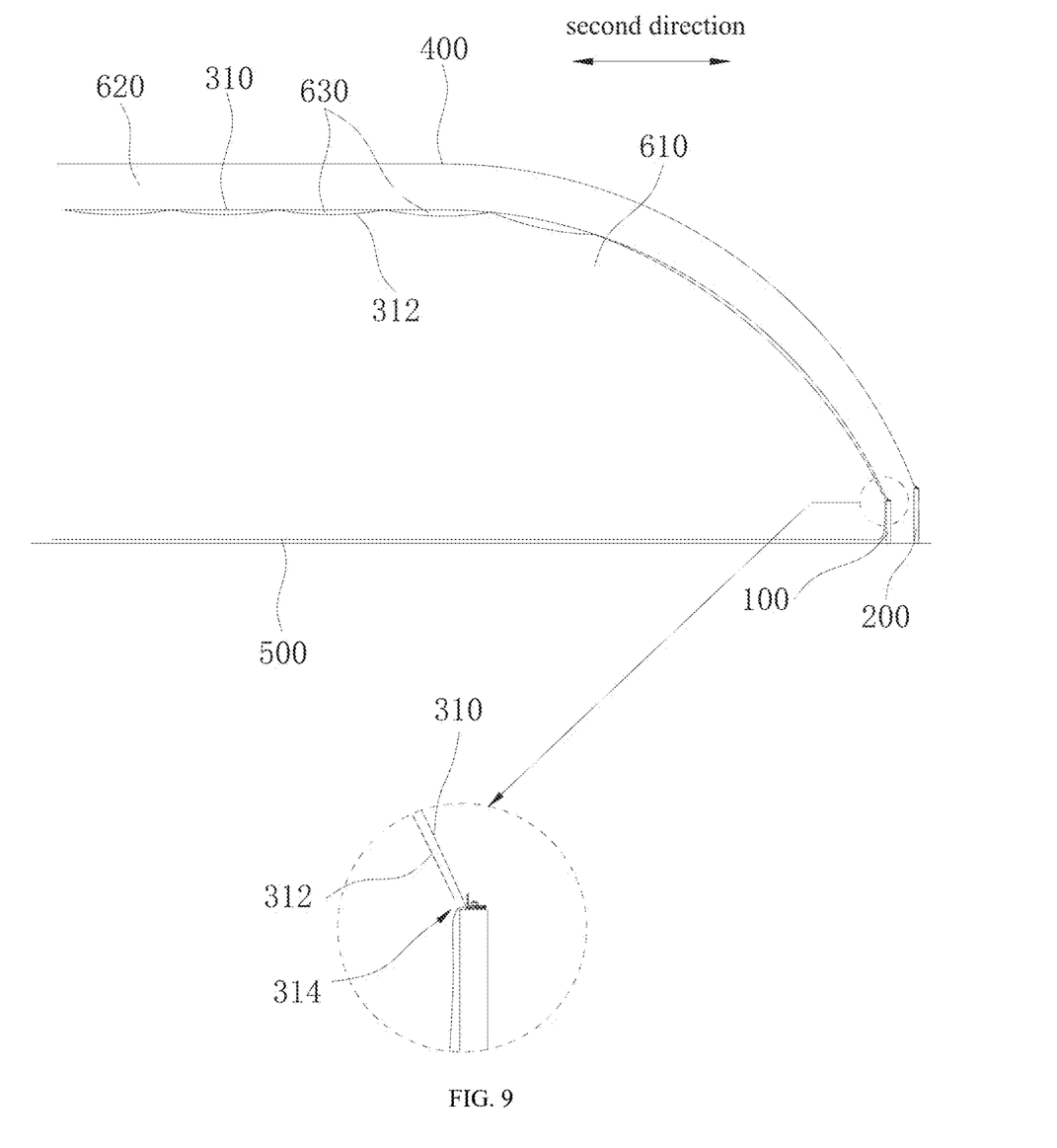
FIG. 9 is a schematic view of an inner membrane insulation layer and an insulation cavity of the gas storage reservoir.

Referring to FIG. 2, FIG. 5 and FIG. 9, in some embodiments, the inner membrane structure 300 further includes an inner membrane insulation layer 312, the inner membrane insulation layer 312 is fixed to an inner side of the inner membrane 310. A thermal insulation in the accommodating cavity 610 is enhanced by the inner membrane insulation layer 312, so that the stored gas is kept within a certain temperature range, and preventing damage to the inner membrane structure 300 caused by a high internal pressure due to a high temperature of the gas stored in the accommodating cavity 610. The inner membrane insulation layer 312 can be fixed to the inner side of the inner membrane 310 by means of bonding, welding or heat sealing.

Figure 10:
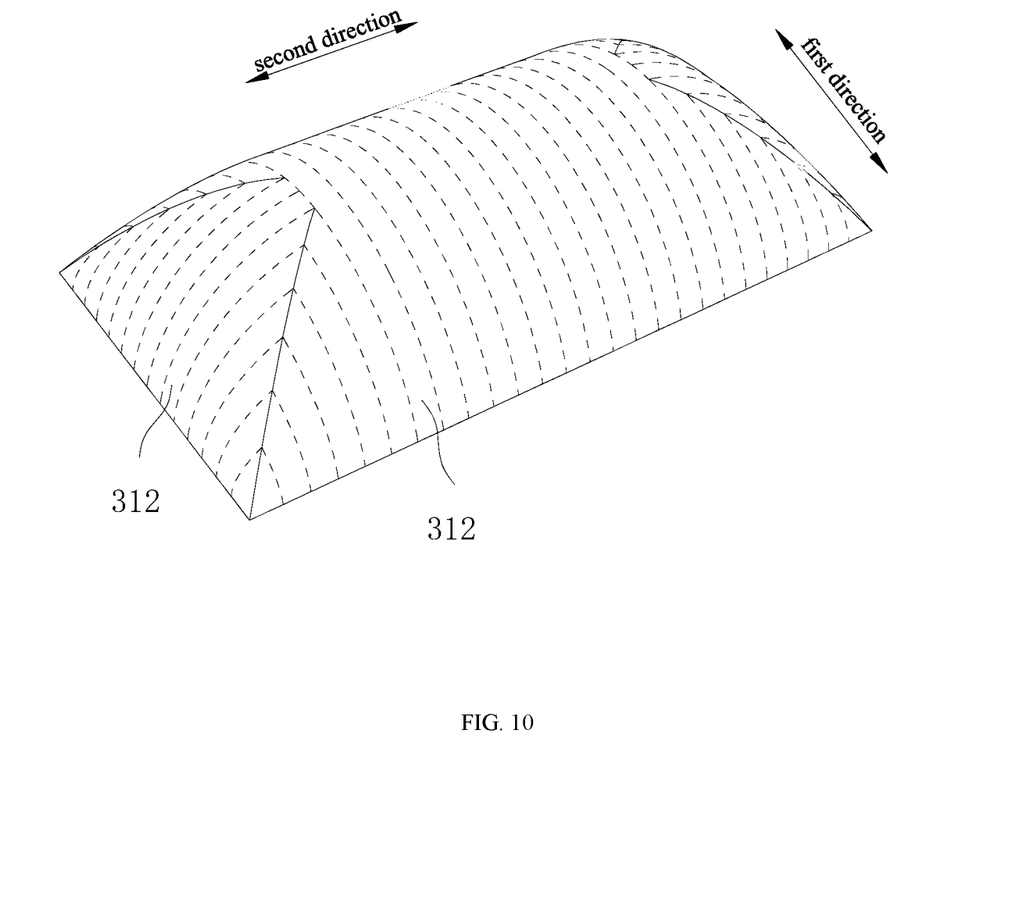
FIG. 10 is a schematic view of a position distribution of an inner membrane insulation layer of the gas storage reservoir in FIG. 1.

Specifically, in some embodiments, the inner membrane insulation layer 312 includes a single-layer lining membrane, a material of the lining membrane is the same as or similar to the material of the outer membrane. The lining membrane is in the shape of an arc strip, an insulation cavity 630 is defined between each lining membrane and the inner membrane 310. The multiple lining membranes are independent of each other, the multiple thermal insulation cavities 630 are independent of each other. Openings 314 are provided between both ends of each lining membrane (that is, adjacent to the inner foundation structure 100) and the inner membrane 310, so that each insulation cavity 630 is in communication with the accommodating cavity 610. The lining membrane will naturally sag under the action of gravity. When the gas is stored in the accommodating cavity 610, the gas enters the insulation cavity 630 from the above-mentioned opening. Compared with the conventional way of configuring insulation layers such as asbestos, a weight of the inner membrane structure 300 can be reduced in this way, and a thermal conductivity of the gas is less than that of solid insulation materials such as asbestos, a gas convection in the insulation cavity 630 is also weaker, which allows for better thermal insulation effect. Further, referring to FIG. 10, in some embodiments, in a region adjacent to the middle in a second direction, the lining membrane extends along the first direction, a plurality of lining membranes are arranged along the second direction. In the area adjacent to both sides in the second direction, the lining membrane extends along the second direction, a plurality of lining membranes are arranged along the first direction. In this area, in the area adjacent to both sides in the first direction, there are also a plurality of lining membranes arranged along the second direction. Of course, a position of the lining membrane is related to a shape of the gas storage reservoir, and can be adjusted according to the shape of the gas storage reservoir.

In other embodiments, the inner membrane insulation layer 312 may also include multiple layers of inner liner membranes. In addition to the insulation cavity 630 provided between the lining membrane and the inner membrane 310 in the foregoing embodiments, the insulation cavity 630 is also provided between adjacent lining membranes, that is, there are multiple layers of insulation cavity 630 along a thickness direction of the membrane material. Adjacent two layers of lining membranes are connected by means of welding or heat sealing, and openings are provided adjacent to both ends of the two (that is, adjacent to the inner foundation structure 100) in the first direction. In this way, thermal insulation effect can be further enhanced.

In some embodiments, the outer membrane 410 includes an outer membrane insulation layer 411 to enhance insulation. A structure and an arrangement of the outer membrane insulation layer 411 may be a conventional insulation structure, or the same as that of the inner membrane insulation layer 312, which will not be repeated here. Similarly, an insulation layer 510 is also provided under the ground membrane 500 to enhance thermal insulation. In some embodiments, the insulation layer 510 is located on the ground.

Referring to FIG. 5, in some embodiments, the gas storage reservoir also includes a door system, specifically, includes an outer door system 710 and an inner door system 720. The outer door system 710 is provided at the outer foundation structure 200, the inner door system 720 is provided at the inner foundation structure 100. The outer door system 710 separates the sandwich cavity 620 from the outside, the inner door system 720 separates the accommodating cavity 610 from the sandwich cavity 620. Maintenance personnel can enter an annular passage between the inner foundation structure 100 and the outer foundation structure 200 through the outer door system 710 for maintenance, and can also enter the accommodating cavity 610 through the inner door system 720 from the annular passage.

Preferably, both the outer door system 710 and the inner door system 720 use interlocking doors. The outer door system 710 is taken as an example for description. The outer door system 710 includes a first outer door 711 and a second outer door 712, the first outer door 711 is located on a side adjacent to the outside world, the second outer door 712 is located on a side adjacent to the sandwich cavity 620, and a buffer chamber 713 is formed between the first outer door 711 and the second outer door 712. The first outer door 711 and the second outer door 712 cannot be opened at the same time. For example, after opening the first outer door 711 and entering the buffer chamber 713, the first outer door 711 must be closed to open the second outer door 712 to enter the sandwich cavity 620. If after opening the first outer door 711 and entering the buffer chamber 713, and the first outer door 711 is not closed, the second outer door 712 cannot be opened. In this way, an influence of external air pressure to the inner air pressure in the sandwich cavity 620 can be reduced, so that the air pressure in the sandwich cavity 620 is relatively stable. Similarly, the inner door system 720 allows for a more stable air pressure in the accommodating cavity 610. The above-mentioned interlocking door can directly use the interlocking door in the prior art.

Figure 6:
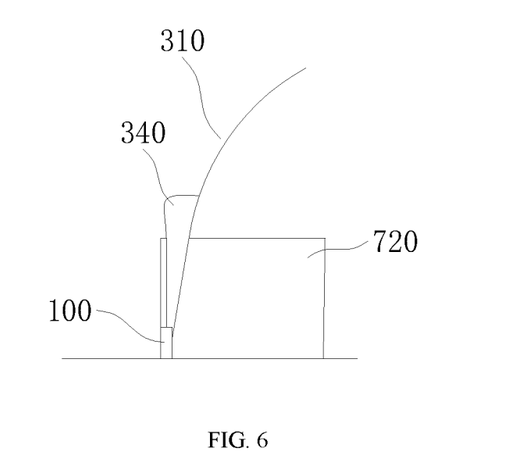
FIG. 6 is a lateral schematic view of a connection at an inner membrane and an inner door system of the gas storage reservoir in FIG. 1.
Figure 7:
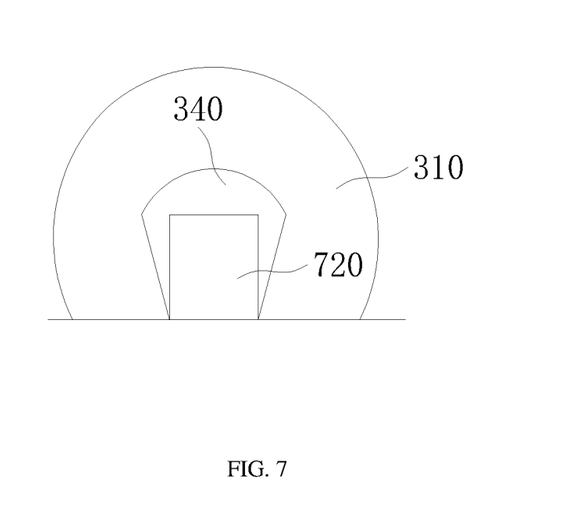
FIG. 7 is a front schematic view of a connection at an inner membrane and an inner door system of the gas storage reservoir in FIG. 1.

If the inner support element 110 is higher than the inner door system 720, the above-mentioned inner door system 720 can be located on the inner support element 110, a door hole can be provided on the inner support element 110 for mounting. If the inner support element 110 is lower than the inner door system 720, a lower half of the inner door system 720 can also be connected to the inner support element 110, a portion of the inner membrane 310 within a range of the inner door system 720 can be connected to the inner door system 720, and the other portions are connected to the inner support element 110 at the corresponding position. For a smooth transition between the inner door system 720 and the inner membrane 310, the inner membrane 310 and the inner door system 720 are connected through a soft connection portion 340. The soft connection portion 340 is also made of air membrane material, and is arranged around the inner door system 720, the inner membrane 310 is connected to the soft connection portion 340. A structure of the outer door system 710 is similar to that of the inner door system 720, it can be configured in the above-mentioned manner.

Referring to FIG. 5, in some embodiments, the exhaust device 810 and the air supply device 820 are located on the outer support element 210. Referring to FIG. 2, specifically, a bracket 230 protrudes outward from the outer support element 210, and the air supply device is fixed to the bracket 230. The exhaust device 810 is mounted in a slot provided on the outer support element 210. Sealing elements are provided at joints of the exhaust device 810, the air supply device 820 and the outer infrastructure 200 to enhance sealing.

Referring to FIG. 2, an air inlet pipe 830 and an air outlet pipe 840 are buried below the ground membrane 500. Ends of the air inlet pipe 830 and the air outlet pipe 840 extend through the membrane 500, the joints between the two and the ground membrane 500 is sealed. The gas flows into the accommodating cavity 610 through the air inlet pipe 830, and flows out of the accommodating cavity 610 through the air outlet pipe 840. Of course, the air inlet pipe 830 and the air outlet pipe 840 can also be located above the ground.

Figure 8:
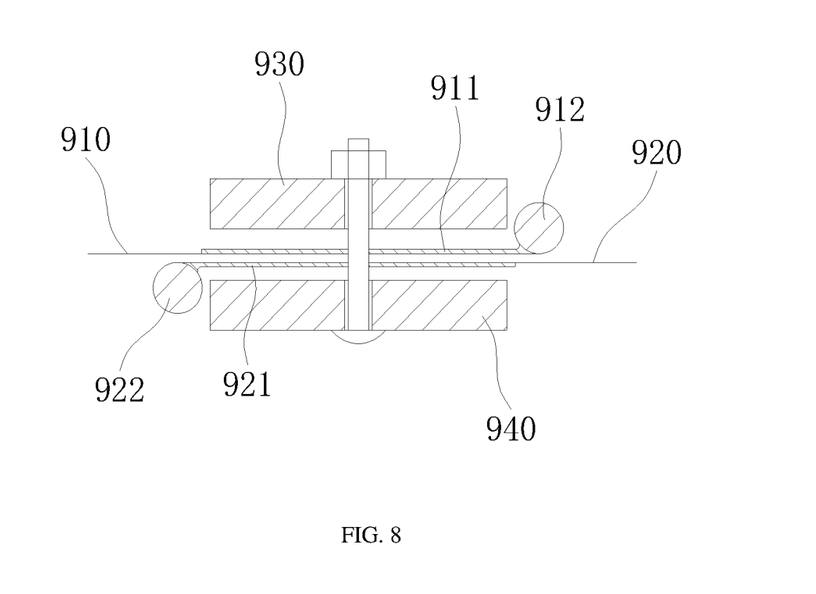
FIG. 8 is a schematic view of a splicing of an outer membrane in FIG. 1.

Referring to FIG. 8, in some embodiments, the outer membrane 410 may be formed by splicing. For example, an edge of a first membrane material 910 is bent to form a first bending area 911, a first limiting portion 912 is provided within the first bending area 911. An edge of a second membrane material 920 is bent to form a second bending area 921, a second limiting portion 922 is provided within the second bending area 921. The edge of the first membrane material 910 overlaps with the edge of the second membrane material 920, and a first splicing plate 930 and a second splicing plate 940 are respectively provided on the outer sides of the two, the first splicing plate 930 is fixed to the second splicing plate 940, thereby achieving the splicing of the first membrane material 910 and the second membrane material 920. Multiple membrane materials can be spliced according to the above method. Similar to the aforementioned limiting element 330, the first limiting portion 912 and the second limiting portion 922 can be ropes. The first splicing plate 930 and the second splicing plate 940 may be connected by threaded fasteners.

In some embodiments, the gas storage reservoir further includes a pressure relief device, which is provided between the accommodating cavity 610 and the sandwich cavity 620. Specifically, the pressure relief device includes a pressure relief valve. When the pressure in the accommodating cavity 610 exceeds a safety pressure, the pressure relief valve opens to allow the gas in the accommodating cavity 610 to flow into the sandwich cavity 620 to reduce the gas pressure in the accommodating cavity 610.

In some embodiments, the gas storage reservoir further includes a volume measuring device for measuring the volume of the accommodating cavity 610, any volume measuring device in the prior art may be used.

As mentioned above, when the gas is stored in the accommodating cavity 610, the inner membrane 310 will be gradually supported upward, the volume of the accommodating cavity 610 will gradually increase, the volume of the sandwich cavity 620 will gradually decrease, and the air pressure in the sandwich cavity 620 will gradually increase. If the air pressure in the sandwich chamber 620 is too high compared to the outside, the outer membrane 410 may be subjected to excessive force and there is a risk of tearing. When the gas is discharged from the accommodating cavity 610, the inner membrane 310 will gradually collapse downwards, the volume of the accommodating cavity 610 will gradually decrease, the volume of the sandwich cavity 620 will gradually increase, the air pressure in the sandwich cavity 620 will gradually decrease. If the air pressure in the sandwich cavity 620 is too low compared to the outside, the outer membrane 410 may collapse slightly and cannot maintain an original shape, and cannot resist strong wind and heavy snow. Therefore, it is necessary to control the air pressure in the sandwich cavity 620 to keep the air pressure difference between the sandwich cavity 620 and the outside stable, so as to ensure a strength and a stability of the outer membrane structure 400.

In some embodiments, a first differential pressure sensor is also provided to monitor a differential pressure between the sandwich chamber 620 and the outside, so as to facilitate timely control of the exhaust device 810 and the air supply device 820, to keep the differential pressure between the sandwich chamber 620 and the outside world stable, to ensure the safety and stability of the outer membrane structure 400, and to meet the requirements of wind and snow resistance.

In some embodiments, an energy storage device includes the above-mentioned gas storage reservoir. The gas can be output to the energy storage device through the gas storage reservoir, or the gas can be stored in the gas storage reservoir. By using the above gas storage reservoir with a larger volume to store more gas, the gas supply will be more sufficient during energy storage, which can achieve more energy storage and release, and the accumulated leakage of gas during long-term storage will be less.

In some embodiments, the above energy storage device also includes a liquid storage tank, an energy storage component, an energy releasing component and a heat exchanging component. A liquid carbon dioxide under high pressure is stored in the liquid storage tank. A gaseous carbon dioxide under normal temperature and pressure is stored in the gas storage reservoir, the pressure and temperature inside the gas storage reservoir are maintained within a certain range to meet the energy storage requirements. The energy storage component is located between the gas storage reservoir and the liquid storage tank. The gaseous carbon dioxide flowing out of the gas storage reservoir is converted into a liquid through the energy storage component and flows into the liquid storage tank. In this process, the energy storage is completed. The energy releasing component is also located between the gas storage reservoir and the liquid storage tank. The liquid carbon dioxide flowing out of the liquid storage tank is converted into a gas state through the energy releasing component and flows into the gas storage tank. In this process, the energy stored in the energy storage process is released. During a low period of electricity consumption, the surplus power output from a power plant can achieve a conversion of carbon dioxide from a gaseous state to a liquid state, and store the energy. During a peak period of electricity consumption, this part of energy will be released to drive the generator to generate electric energy.

In some embodiments, a control method of the above gas storage reservoir is to keep the differential pressure between the sandwich chamber 620 and the outside world constant. In this way, the strength and stability of the outer membrane structure 400 can be guaranteed.

Specifically, the aforementioned first differential pressure sensor monitors the differential pressure between the sandwich chamber 620 and the outside world in real time and feeds it back to a controller. The controller controls the exhaust device 810 and the air supply device 820 to dynamically balance the air pressure difference between the sandwich chamber 620 and the outside world. Specifically, when the accommodating cavity 610 is filled with the gas, the controller controls the exhaust device 810 to increase an amount of the gas discharged from the sandwich cavity 620, and/or the controller controls the air supply device 820 to reduce the amount of the gas sent to the sandwich cavity 620. When the gas is discharged from the accommodating cavity 610, the controller controls the exhaust device 810 to reduce the amount of the gas discharged from the sandwich cavity 620, and/or the controller controls the air supply device 820 to increase the amount of the gas sent to the sandwich cavity 620. The stability of differential pressure is achieved through feedback regulation.

When mounting the gas storage reservoir in any of the above embodiments, the inner foundation structure 100, the outer foundation structure 200, and the door system are built first, and the exhaust device 810 and air supply device 820 are mounted on the outer foundation structure 200. The outer membrane structure is then laid, the outer membrane 410 and the outer cable net 420 are both fixed to the outer foundation structure 200 and the outer membrane 410 is inflated to enable the outer membrane 410 to be held up into shape. Then the ground membrane 500, the inner membrane 310 and the inner cable net 320 laid inside the outer membrane 410, the inner membrane 310 and the inner web 320 are fixed to the inner foundation structure 100 and the inner membrane 310 is connected to the ground membrane 500 to form the accommodating cavity 610 between the two.

In the above mounting method, after the outer membrane structure 400 is mounted and inflated to form a support, when mounting the ground membrane 500 and the inner membrane structure 300, due to a protection of the outer membrane structure 400, an external environment is not easy to affect the mounting of the inner membrane structure 300 and the ground membrane 500. Rain, snow, dust and sundries will not enter the accommodating cavity 610 formed by the inner membrane structure 300 and the ground membrane 500.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A gas storage reservoir, comprising:
a ground membrane;
an inner foundation structure surrounding an outer side of the ground membrane;
an outer foundation structure surrounding an outer side of the inner foundation structure;
an inner membrane structure comprising an inner membrane and an inner cable net, wherein an edge of the inner membrane is fixed to the inner foundation structure, the ground membrane is connected to the inner membrane, the inner cable net is provided on an outer surface of the inner membrane, the inner cable net is fixed to the inner foundation structure, an accommodation cavity is defined between the inner membrane and the ground membrane, the inner membrane comprises a metal layer;
an outer membrane structure covering an outside of the inner membrane structure, wherein the outer membrane structure comprises an outer membrane and an outer cable net, an edge of the outer membrane is fixed to the outer foundation structure, the outer cable net is provided on an outer surface of the outer membrane, the outer cable net is fixed to the outer foundation structure, a sandwich cavity is defined between the outer membrane and the inner membrane;
an air supply device configured to inflate the sandwich cavity; and
an exhaust device configured to discharge a gas in the sandwich cavity,
wherein the inner membrane structure further comprises an inner membrane insulation layer including a lining membrane suspended on the inner membrane, an insulation cavity is formed between the lining membrane and the inner membrane, the insulation cavity is in communication with the accommodating cavity.

2. The gas storage reservoir according to claim 1, wherein the ground membrane comprises a metal layer.

3. The gas storage reservoir according to claim 1, wherein the inner foundation structure comprises an inner support element and an inner fixing element, the edge of the inner membrane is sandwiched between the inner support element and the inner fixing element, the inner support element is fixed to the inner fixing element.

4. The gas storage reservoir according to claim 1, wherein a hook or a pulley is provided on the inner foundation structure, the inner cable net is hung on the hook or the pulley.

5. The gas storage reservoir according to claim 1, wherein the outer foundation structure comprises an outer support element and an outer fixing element, the edge of the outer membrane is sandwiched between the outer support element and the outer fixing element, and the outer support element is fixed to the outer fixing element.

6. The gas storage reservoir according to claim 1, wherein a hook or a pulley is provided on the outer foundation structure, the outer cable net is hung on the hook or the pulley.

7. The gas storage reservoir according to claim 1, wherein the inner foundation structure and the outer foundation structure are connected as a whole.

8. The gas storage reservoir according to claim 1, wherein the outer membrane structure further comprises an outer membrane insulation layer.

9. The gas storage reservoir according to claim 1, wherein an insulation layer is provided under the ground membrane.

10. The gas storage reservoir according to claim 1, further comprising a volume measuring device configured to measure a volume of the accommodating cavity.

11. The gas storage reservoir according to claim 1, further comprising a door system, wherein the door system comprises an outer door system that communicates an outside world with the sandwich cavity.

12. An energy storage device, comprising the gas storage reservoir according to claim 1.

13. A control method of the gas storage reservoir according to claim 1, comprising: keeping an air pressure difference between the sandwich cavity and the outside constant.

14. The control method of the gas storage reservoir according to claim 13, wherein the air pressure difference between the sandwich cavity and the outside world is monitored in real time and fed back to a controller, when the accommodating cavity is filled with the gas, the controller controls the exhaust device to increase an amount of the gas discharged from the sandwich cavity;
when the gas is discharged from the accommodating cavity, the controller controls the exhaust device to reduce the amount of the gas discharged from the sandwich cavity.

15. A mounting method of the gas storage reservoir according to claim 1, wherein after the inner foundation structure, the outer foundation structure, the air supply device, the exhaust device, and the door system are mounted, the outer membrane structure is first mounted and inflated, then the ground membrane and the inner membrane structure are mounted.

16. The gas storage reservoir according to claim 1, further comprising a door system, wherein the door system comprises an inner door system that communicates the sandwich cavity with the accommodating cavity.

17. The control method of the gas storage reservoir according to claim 13, wherein the air pressure difference between the sandwich cavity and the outside world is monitored in real time and fed back to a controller, when the accommodating cavity is filled with the gas, the controller controls the air supply device to reduce a amount of the gas sent to the sandwich cavity;
when the gas is discharged from the accommodating cavity, the controller controls the air supply device to increase the amount of the gas sent to the sandwich cavity.

* * * * *